US012300804B2

(12) United States Patent
Jeong et al.

(10) Patent No.: US 12,300,804 B2
(45) Date of Patent: May 13, 2025

(54) ELECTRODE ASSEMBLY AND SECONDARY BATTERY COMPRISING SAME

(71) Applicant: Samsung SDI Co., Ltd., Yongin-si (KR)

(72) Inventors: Hyun Ki Jeong, Yongin-si (KR); Dong Jin An, Yongin-si (KR); Seung Young Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 579 days.

(21) Appl. No.: 17/632,090

(22) PCT Filed: Aug. 5, 2020

(86) PCT No.: PCT/KR2020/010320
§ 371 (c)(1),
(2) Date: Feb. 1, 2022

(87) PCT Pub. No.: WO2021/029597
PCT Pub. Date: Feb. 18, 2021

(65) Prior Publication Data
US 2022/0278308 A1 Sep. 1, 2022

(30) Foreign Application Priority Data
Aug. 13, 2019 (KR) .................. 10-2019-0098975

(51) Int. Cl.
*H01M 4/13* (2010.01)
*H01M 10/04* (2006.01)
(Continued)

(52) U.S. Cl.
CPC ......... *H01M 4/13* (2013.01); *H01M 10/0422* (2013.01); *H01M 10/0587* (2013.01); *H01M 2010/4292* (2013.01)

(58) Field of Classification Search
CPC ............... H01M 4/13; H01M 10/0422; H01M 10/0587; H01M 2010/4292;
(Continued)

(56) References Cited

U.S. PATENT DOCUMENTS 6,258,478 B1 7/2001 Kim
8,129,049 B2 3/2012 Kim et al.
(Continued)

FOREIGN PATENT DOCUMENTS

| CN | 103840096 A | 6/2014 |
| CN | 106207070 A | 12/2016 |

(Continued)

OTHER PUBLICATIONS

International Search Report, with English translation, dated Nov. 24, 2020, issued in PCT/KR/2020/010320, 5 pages.
(Continued)

*Primary Examiner* — Daniel S Gatewood
(74) *Attorney, Agent, or Firm* — Womble Bond Dickinson (US) LLP

(57) ABSTRACT

The present invention relates to an electrode assembly and a secondary battery comprising same, wherein by adjusting at least one of a loading level of a positive electrode coating layer and a loading level of a negative electrode coating layer, the negative electrode coating layer can be prevented from unnecessarily increasing in capacity, and a minimum capacity ratio of a positive electrode versus a negative electrode can be maintained in order to minimize lithium precipitation according to the number of winding turns of an electrode assembly.

10 Claims, 8 Drawing Sheets

(51) Int. Cl.
H01M 10/0587 (2010.01)
H01M 10/42 (2006.01)

(58) Field of Classification Search
CPC .......... H01M 50/107; H01M 10/0431; H01M 2004/027; H01M 10/052; H01M 2004/021; H01M 2004/028; H01M 10/04; H01M 50/147; H01M 10/42
See application file for complete search history.

(56) References Cited

U.S. PATENT DOCUMENTS

| | | |
|---|---|---|
| 8,592,082 B2 | 11/2013 | Lee et al. |
| 9,263,761 B2 | 2/2016 | Kwak et al. |
| 10,854,908 B2 | 12/2020 | Kim et al. |
| 2010/0104930 A1 | 4/2010 | Kim et al. |
| 2013/0196226 A1 | 8/2013 | Lee et al. |
| 2014/0147714 A1 | 5/2014 | Kwak et al. |
| 2015/0340730 A1 | 11/2015 | Kim et al. |

FOREIGN PATENT DOCUMENTS

| | | |
|---|---|---|
| EP | 2 833 459 A2 | 2/2015 |
| JP | 2004-303484 A | 10/2004 |
| JP | 3614984 B2 | 1/2005 |
| JP | 2011-138729 A | 7/2011 |
| KR | 10-1999-0066181 A | 8/1999 |
| KR | 10-0963981 B1 | 6/2010 |
| KR | 10-2013-0087968 A | 8/2013 |
| KR | 10-2015-0049519 A | 5/2015 |
| KR | 10-2015-0133554 A | 11/2015 |
| KR | 10-2017-0022289 A | 3/2017 |
| KR | 10-2018-0048038 A | 5/2018 |
| KR | 20180048038 A * | 5/2018 |
| WO | WO 2011/080901 A1 | 7/2011 |

OTHER PUBLICATIONS

EPO Extended European Search Report dated Jan. 30, 2024, issued in corresponding European Patent Application No. 20852423.1, 9 pages.
Second Office Action dated Jul. 17, 2024 for corresponding Chinese Patent Application No. 202080056970.7, 6 pages.
Korean Office Action dated Nov. 20, 2024 for corresponding Korean Patent Application No. 10-2019-0098975, 7 pages.

* cited by examiner

ELECTRODE ASSEMBLY AND SECONDARY BATTERY COMPRISING SAME

CROSS-REFERENCE TO RELATED APPLICATION(S)

This application is a U.S. National Phase Patent Application of International Application Number PCT/KR2020/010320, filed on Aug. 5, 2020, which claims priority of Korean Patent Application Number 10-2019-0098975, filed on Aug. 13, 2019, the entire content of each of which is incorporated herein by reference.

TECHNICAL FIELD

The present invention relates to an electrode assembly and a secondary battery including the same.

BACKGROUND ART

A secondary battery is a power storage system that provides excellent energy density to change electrical energy into chemical energy so as to store the chemical energy. When compared to non-rechargeable primary batteries, secondary batteries are rechargeable and are widely used for IT devices such as smartphones, cellular phones, laptops, tablet PCs, and the like. Recently, interests in electric vehicles have increased to prevent environmental pollution, and thus, high-capacity secondary batteries are being adopted for the electric vehicles. Such secondary batteries are required to have characteristics such as high density, high output, and stability.

The above-described information disclosed in the technology that serves as the background of the present invention is only for improving understanding of the background of the present invention and thus may include information that does not constitute the related art.

DISCLOSURE OF THE INVENTION

Technical Problem

The present invention provides an electrode assembly, in which at least one of a loading level of a positive electrode coating layer or a loading level of a negative electrode coating layer is adjusted so that the negative electrode coating layer is prevented from unnecessarily increasing in capacity, and a minimum ratio in capacity of a negative electrode to a positive electrode is maintained to minimize lithium precipitation according to the number of turns of winding of an electrode assembly, and a secondary battery including the same.

The present invention also provides an electrode assembly, in which a ratio in capacity of a negative electrode to a positive electrode is optimally maintained according to the number of turns of the electrode assembly to increase in amount of output to a capacity of the electrode assembly, and a secondary battery including the same.

Technical Solution

An electrode assembly according to an embodiment of the present invention includes: a negative electrode plate on which a negative electrode coating layer is formed on both surfaces of a negative electrode current collector; a positive electrode plate on which a positive electrode coating layer is formed on both surfaces of a positive electrode current collector; and a separator interposed between the positive electrode plate and the negative electrode plate, wherein the positive electrode coating layer includes: a first positive electrode coating layer formed on a front end area of a first surface of the positive electrode current collector; a second positive electrode coating layer formed on the front end area of a second surface that is an opposite surface of the first surface of the positive electrode current collector; a third positive electrode coating layer formed on a rear end area of the first surface of the positive electrode current collector; and a fourth positive electrode coating layer formed on the rear end area of the second surface of the positive electrode current collector, wherein a loading level of the first positive electrode coating layer is greater than a loading level of the second positive electrode coating layer, and each of a loading level of the third positive electrode coating layer and a loading level of the fourth positive electrode coating layer is less than the loading level of the first positive electrode coating layer and is greater than the loading level of the second positive electrode coating layer.

The sum of the loading level of the first positive electrode coating layer and the leading level of the second positive electrode coating layer may be equal to or less than the sum of the loading level of the third positive electrode coating layer and the loading level of the fourth positive electrode coating layer.

The negative electrode coating layer may include: a first negative electrode coating layer formed on a front end area of a first surface of the negative electrode current collector; a second negative electrode coating layer formed on the front end area of a second surface that is an opposite surface of the first surface of the negative electrode current collector; a third negative electrode coating layer formed on a rear end area of the first surface of the negative electrode current collector; and a fourth negative electrode coating layer formed on the rear end area of the second surface of the negative electrode current collector.

The loading level of the first negative electrode coating layer and the leading level of the third negative electrode coating layer may be the same, and the loading level of the second negative electrode coating layer and the loading level of the fourth negative electrode coating layer may be the same and less than the loading level of the first negative electrode coating layer.

The loading level of the first negative electrode coating layer may be greater than the leading level of the second negative electrode coating layer, and the loading level of the third negative electrode coating layer and the loading level of the fourth negative electrode coating layer may be less than the loading level of the first negative electrode coating layer and greater than the loading level of the second negative electrode coating layer.

The sum of the loading level of the first negative electrode coating layer and the leading level of the second negative electrode coating layer may be the same as the sum of the loading level of the third negative electrode coating layer and the loading level of the fourth negative electrode coating layer.

The positive electrode plate may further include: a first positive electrode non-coating portion, on which the first positive electrode coating layer and the third positive electrode coating layer are spaced apart from each other so that the positive electrode coating layer is not formed, on the first surface; a second positive electrode non-coating portion, on which the second positive electrode coating layer and the fourth positive electrode coating layer are spaced apart from each other so that the positive electrode coating layer is not formed, on the second surface; and a positive electrode tab attached to any one of the first positive electrode non-coating portion or the second positive electrode non-coating portion.

The negative electrode plate may further include: a first negative electrode non-coating portion, on which the first negative electrode coating layer and the third negative electrode coating layer are spaced apart from each other so that the negative electrode coating layer is not formed, on the first surface; a second negative electrode non-coating portion, on which the second negative electrode coating layer and the fourth negative electrode coating layer are spaced apart from each other so that the negative electrode coating layer is not formed, on the second surface; and a negative electrode tab attached to any one of the first negative electrode non-coating portion or the second negative electrode non-coating portion.

In addition, an electrode assembly according to an embodiment of the present invention includes: a negative electrode plate on which a negative electrode coating layer is formed on both surfaces of a negative electrode current collector; a positive electrode plate on which a positive electrode coating layer is formed on both surfaces of a positive electrode current collector; and a separator interposed between the positive electrode plate and the negative electrode plate, wherein the positive electrode coating layer includes: a first positive electrode coating layer formed on a front end area of a first surface of the positive electrode current collector; a second positive electrode coating layer formed on the front end area of a second surface that is an opposite surface of the first surface of the positive electrode current collector; a third positive electrode coating layer formed on a rear end area of the first surface of the positive electrode current collector; and a fourth positive electrode coating layer formed on the rear end area of the second surface of the positive electrode current collector, wherein a loading level of the first positive electrode coating layer is greater than a loading level of the second positive electrode coating layer, and each of a loading level of the third positive electrode coating layer and a loading level of the fourth positive electrode coating layer is less than the loading level of the first positive electrode coating layer and is greater than the loading level of the second positive electrode coating layer.

The sum of the loading level of the first negative electrode coating layer and the leading level of the second negative electrode coating layer may be equal to or less than the sum of the loading level of the third negative electrode coating layer and the loading level of the fourth negative electrode coating layer.

The positive electrode coating layer may include: a first positive electrode coating layer formed on a front end area of a first surface of the positive electrode current collector; a second positive electrode coating layer formed on the front end area of a second surface that is an opposite surface of the first surface of the positive electrode current collector; a third positive electrode coating layer formed on a rear end area of the first surface of the positive electrode current collector; and a fourth positive electrode coating layer formed on the rear end area of the second surface of the positive electrode current collector, wherein a loading level of the first positive electrode coating layer may be the same as a loading level of the third positive electrode coating layer, and a loading level of the second positive electrode coating layer and a loading level of the fourth positive electrode coating layer may be the same and less than the loading level of the first positive electrode coating layer.

Advantageous Effects

In the electrode assembly according to the embodiment of the present invention and the secondary battery including the same, at least one of the loading level of the positive electrode coating layer or the loading level of the negative electrode coating layer may be adjusted so that the negative electrode coating layer is prevented from unnecessarily increasing in capacity, and the minimum ratio in capacity of the negative electrode to the positive electrode is maintained to minimize the lithium precipitation according to the number of turns of winding of the electrode assembly.

That is, the embodiment of the present invention may provide the electrode assembly, in which the ratio in capacity of the negative electrode to the positive electrode is optimally maintained according to the number of turns of the electrode assembly to increase in amount of output to the capacity of the electrode assembly, and the secondary battery including the same.

MODE FOR CARRYING OUT THE INVENTION

Figure 1A:
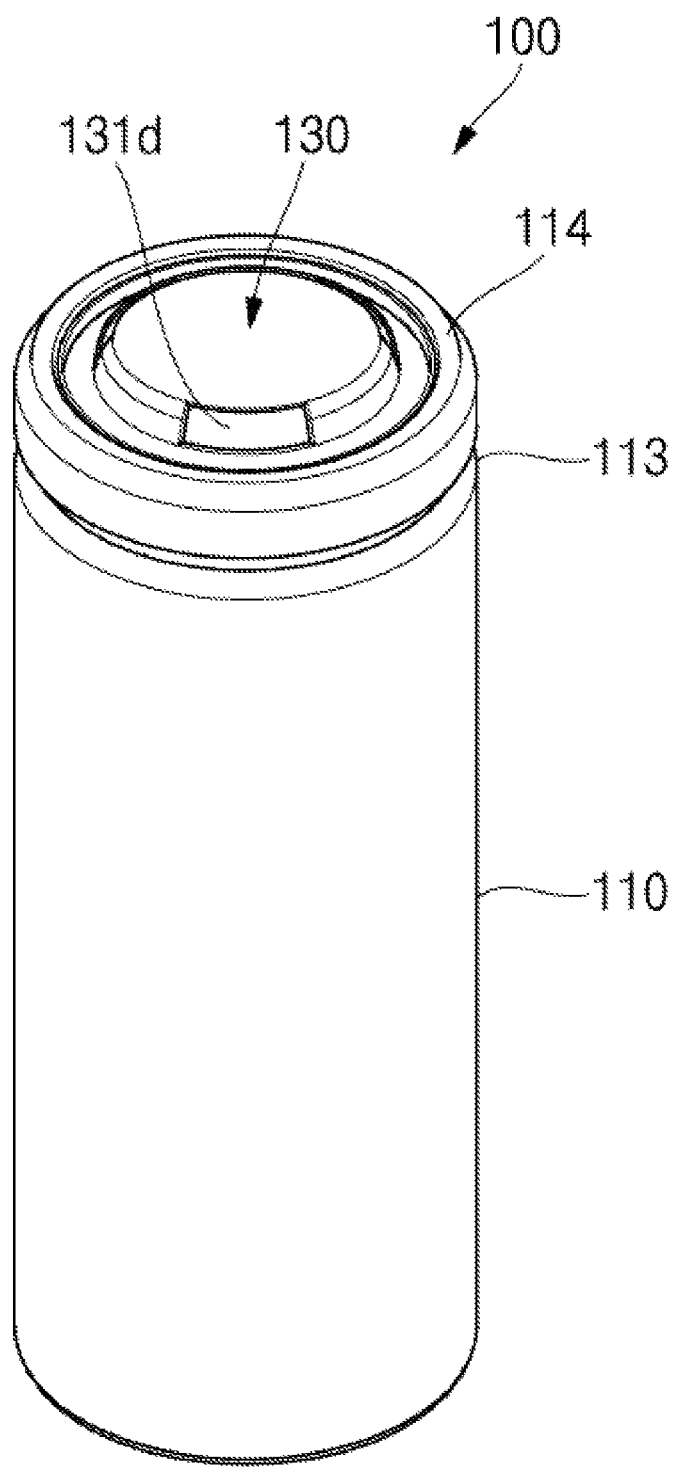
FIGS. 1a, 1b, 1c, and 1d are a perspective view, an exploded perspective view, a longitudinal cross-sectional view, and a cross-sectional view illustrating a secondary battery according to an embodiment of the present invention.
Figure 1B:
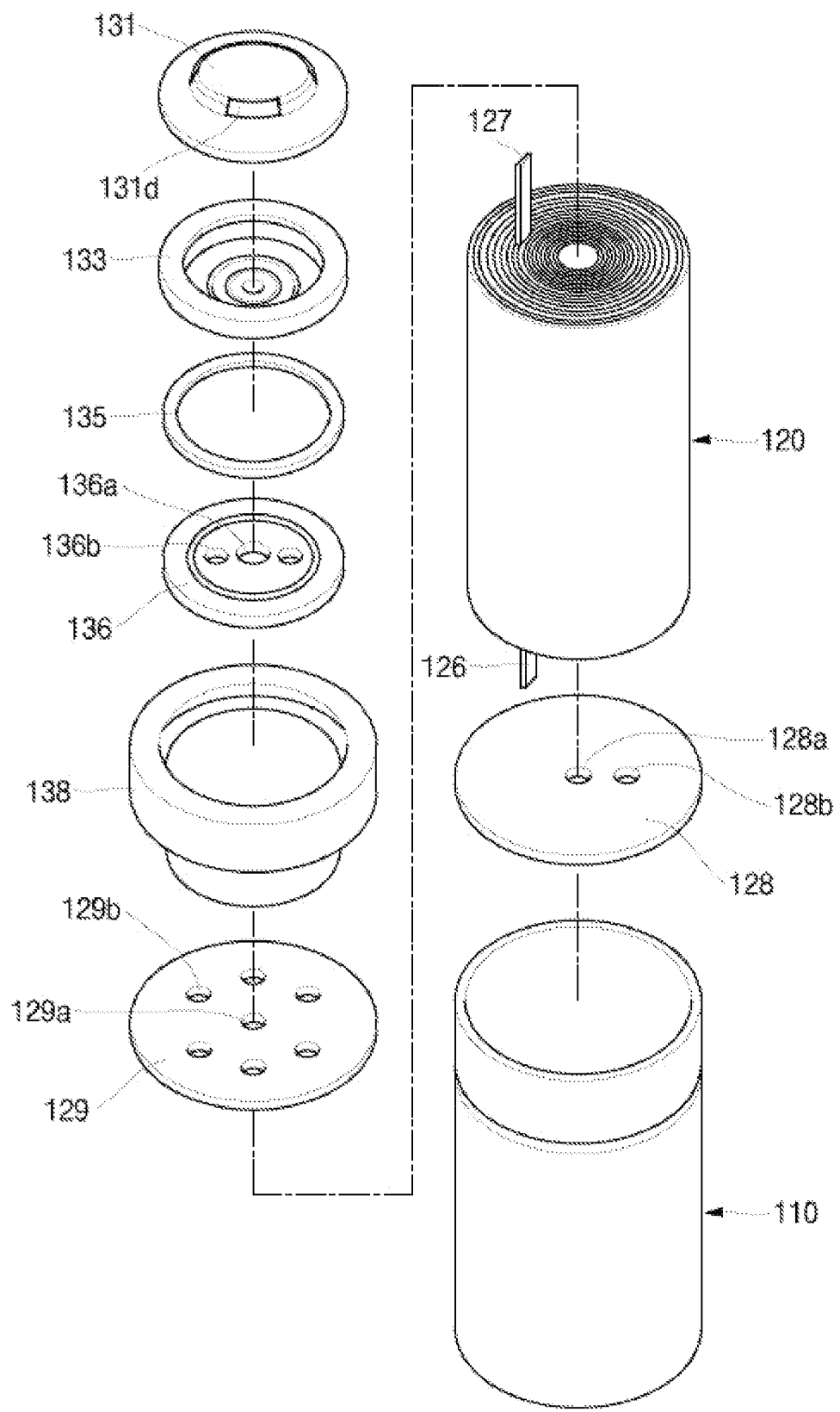
Figure 1C:
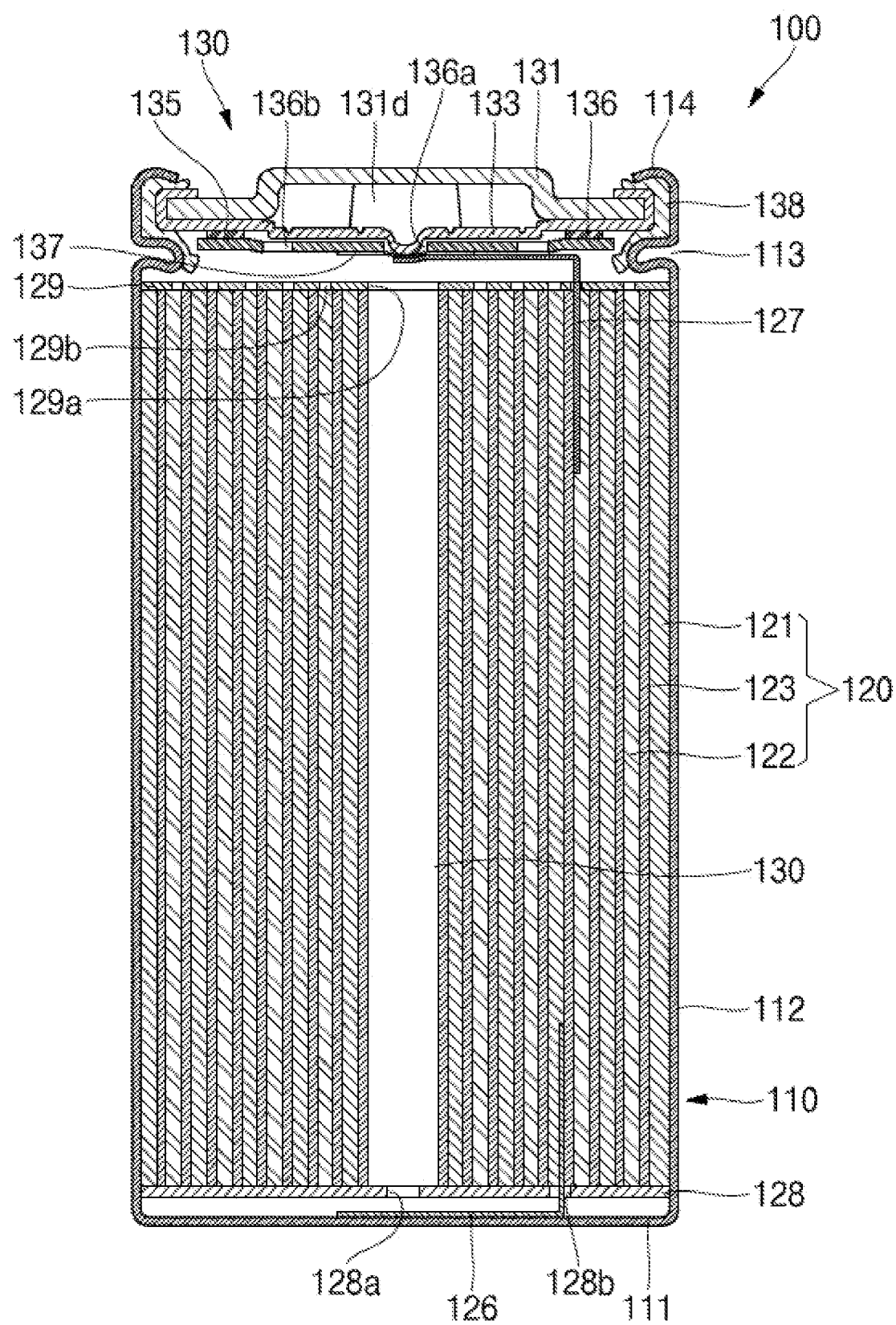
Figure 1D:
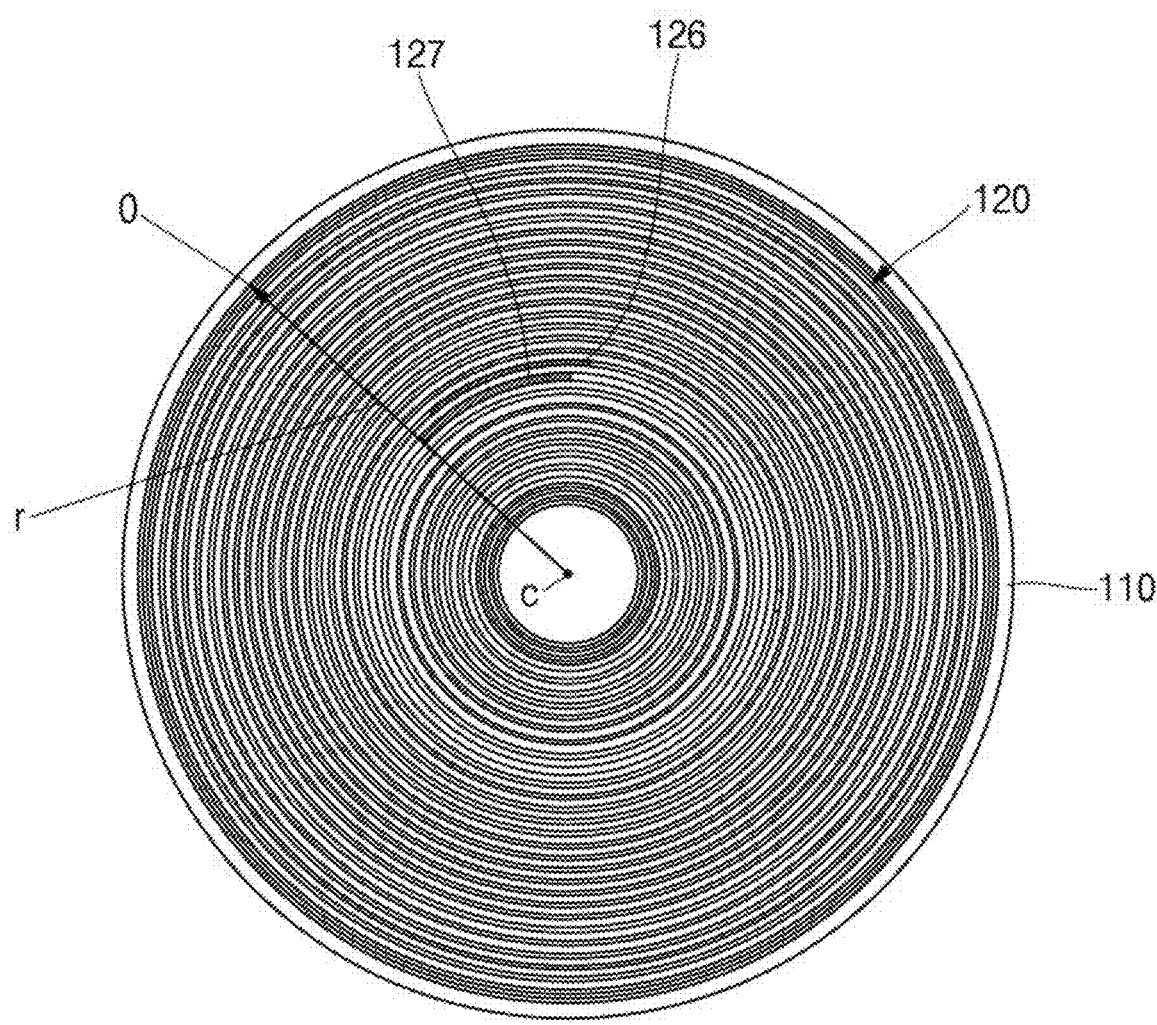

Hereinafter, preferred embodiments will be described in detail with reference to the accompanying drawings. The present invention may, however, be embodied in many different forms and should not be construed as being limited to the embodiments set forth herein; rather, these embodiments are provided so that those skilled in the art thoroughly understand the present invention. Rather, these embodiments are provided so that this disclosure will be thorough and complete, and will fully convey the scope of the present invention to those skilled in the art.

Also, in the drawing figures, the dimensions of layers and regions may be exaggerated for clarity of illustration. Like reference numerals refer to like elements throughout. As used herein, the term "and/or" includes any and all combinations of one or more of the associated listed items. In this specification, it will also be understood that when a member A is referred to as being connected to a member B, the member A can be directly connected to the member B or indirectly connected to the member B with a member B therebetween.

The terms used herein are for illustrative purposes of the present invention only and should not be construed to limit the meaning or the scope of the present invention. As used in this specification, a singular form may, unless definitely indicating a particular case in terms of the context, include a plural form. Also, the expressions "comprise" and/or "comprising" used in this specification neither define the mentioned shapes, numbers, processes, operations, members, elements, and/or groups of these, nor exclude the presence or addition of one or more other different shapes, numbers, processes, operations, members, elements, and/or groups of these, or addition of these. The term "and/or" used herein includes any and all combinations of one or more of the associated listed items.

As used herein, terms such as "first," "second," etc. are used to describe various members, components, regions, layers, and/or portions. However, it is obvious that the members, components, regions, layers, and/or portions should not be defined by these terms. The terms do not mean a particular order, up and down, or superiority, and are used only for distinguishing one member, component, region, layer, or portion from another member, component, region, layer, or portion. Thus, a first member, component, region, layer, or portion which will be described may also refer to a second member, component, region, layer, or portion, without departing from the teaching of the present invention.

Spatially relative terms, such as "below", "beneath", "lower", "above", "upper" and the like, used herein for ease of description to describe one element or feature's relationship to another element(s) or feature(s) as illustrated in the figures. These spatially relative terms are intended for easy comprehension of the prevent invention according to various process states or usage states of the prevent invention, and thus, the present invention is not limited thereto. For example, an element or feature shown in the drawings is turned inside out, the element or feature described as "beneath" or "below" may change into "above" or "upper". Thus the term "below" may encompass the term "above" or "below".

FIGS. 1a, 1b, 1c, and 1d are a perspective view, an exploded perspective view, a longitudinal cross-sectional view, and a cross-sectional view illustrating a secondary battery 100 according to an embodiment of the present invention. Here, the longitudinal cross-section is a cross-section that is cut in a longitudinal direction of the secondary battery 100, and the cross-section is a cross-section that is cut in a winding direction of the secondary battery.

As illustrated in FIGS. 1a, 1b, 1c, and 1d, the secondary battery 100 according to the present invention includes a case 110, an electrode assembly 120 accommodated in the case 110, and a cap assembly 130 that seals an opening of an upper end of the case 110.

The case 110 includes a circular bottom portion 111 and a side portion 112 extending by a predetermined length upward from the bottom portion 111. Here, the secondary battery 100 may be a cylindrical secondary battery formed by winding the electrode assembly 120. During a process of manufacturing the secondary battery 100, the upper portion of the case 110 is opened. Thus, during a process of assembling the secondary battery, the electrode assembly 120 may be inserted into the case 110 together with an electrolyte. The case 110 may be made of steel, a steel alloy, aluminum, an aluminum alloy, or an equivalent thereof, but the material thereof is not limited thereto. In addition, in the can 110, a beading part 113 recessed inward may be formed at a lower portion of the can 110 with respect to the cap assembly 140 to prevent the cap assembly 140 from being separated to the outside, and a crimping part 114 bent inward may be formed at an upper portion of the can 110.

The electrode assembly 120 is accommodated in the case 110 together with the electrolyte. Here, the electrolyte is an organic liquid containing salt injected so that lithium ions move between a positive electrode plate and a negative electrode plate, which constitute the electrode assembly 120 and includes a non-aqueous organic electrolyte that is a mixture of lithium salt such as $LiPF_6$, $LiBF_4$, and $LiClO_4$ with a high-purity organic solvent, but the present invention is not limited thereto.

The electrode assembly 120 includes a negative electrode plate 121 coated with a negative electrode active material, a positive electrode plate 122 coated with a positive electrode active material, and a separator 125 interposed between the negative electrode plate 121 and the positive electrode plate 122 to prevent short circuit from occurring between the negative electrode plate 121 and the positive electrode plate 122 and enabling only lithium ions to move. The negative electrode plate 121, the positive electrode plate 122, and the separator 125 are wound in a substantially cylindrical shape. In addition, in the negative electrode plate 121, a negative electrode tab 126 protruding downward by a predetermined length may be attached to a positive electrode tab 127 protruding upward by a predetermined length, but vice versa.

Figure 2:
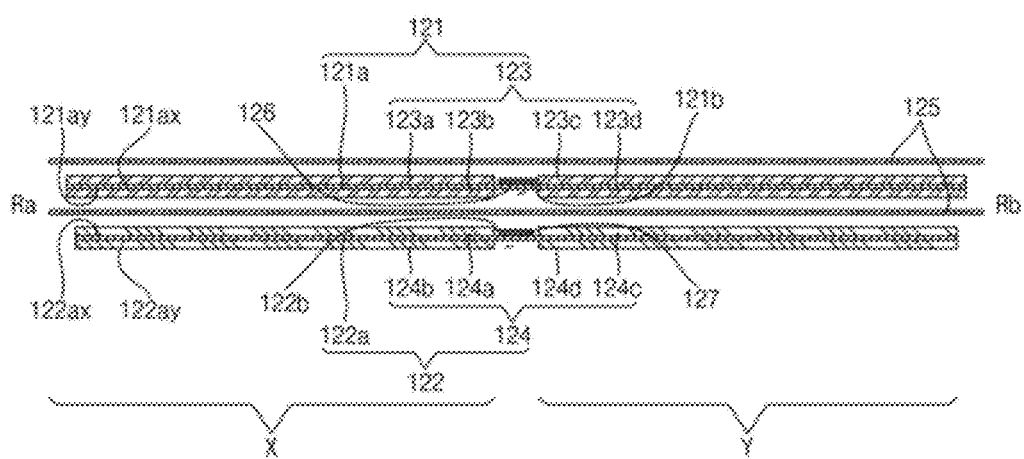
FIG. 2 is an exploded perspective view illustrating a state before an electrode assembly of the secondary battery illustrated in FIGS. 1a to 1d is wound.

Additionally, referring to FIG. 2, an exploded perspective view illustrating a state before the electrode assembly of the secondary battery illustrated in FIGS. 1a to 1d is wound is illustrated. Hereinafter, configurations of the secondary battery and the electrode assembly according to the present invention will be described in detail with reference to FIG. 2.

First, in the negative electrode plate 121 of the electrode assembly 120, a negative electrode coating layer 123, which is an active material made of a transition metal oxide, is applied on both sides of a negative electrode current collector 121a, which is a plate-shaped metal foil made of copper (Cu) or nickel (Ni). The negative electrode coating layer 123 may include a first negative electrode coating layer 123a formed on a front end area X, which is an area adjacent to a front end Ra of a first surface 121ax of the negative electrode current collector 121a, a second negative electrode coating layer 123b formed on a front end area X of a second surface 121ay opposite to the first surface 121ax, a third negative electrode coating layer 123c formed on a rear end area Y adjacent to a rear end Rb of the first surface 121ax of the negative electrode current collector 121a, and a fourth negative electrode coating layer 123d formed on the rear end area Y of the second surface 121*ay*. Here, the front end Ra may be an end at which the negative electrode plate 121 begins to be wound together with the positive electrode plate 211 and the separator 213, and the rear end Rb may be an end at which the winding is terminated.

A loading level of the first negative electrode coating layer 123*a* may be greater than or equal to that of the second negative electrode coating layer 123*b*. Here, the loading level means a coating amount or weight of the coating layer per unit area.

Also, a loading level of the third negative electrode coating layer 123*c* may be greater than or equal to that of the fourth negative electrode coating layer 123*d*. In addition, the sum of the loading level of the first negative electrode coating layer 123*a* and the loading level of the second negative electrode coating layer 123*b* may be greater than or equal to that of the loading level of the third negative electrode coating layer 123*c* and the loading level of the fourth negative electrode coating layer 123*d*.

The first negative electrode coating layer 123*a*, the second negative electrode coating layer 123*b*, the third negative electrode coating layer 123*c*, and the fourth negative electrode coating layer 123*d* may be maintained to a minimum ratio in capacity of the negative electrode to the positive electrode so as to minimize an amount of lithium precipitation according to the number of turns of the wound electrode assembly 120. As described above, a ratio in capacity of the negative electrode to the positive electrode may be optimally maintained according to the number of turns of the electrode assembly 120 to improve efficiency to the capacity of the electrode assembly 120. The above-described loading level of the negative electrode coating layer 123 will be described in detail below.

Also, the first negative electrode coating layer 123*a* and the third negative electrode coating layer 123*c* may be spaced a predetermined distance from each other. That is, the first negative electrode coating layer 123*a* and the third negative electrode coating layer 123*c* may be spaced apart from each other on the first surface 121*ax* of the negative electrode current collector 121*a*, and a first negative electrode non-coating portion 121*b*, on which the negative electrode coating layer 123 is not formed, may be provided on the first surface 121*ax* of the negative electrode current collector 121*a*.

Also, the second negative electrode coating layer 123*b* and the fourth negative electrode coating layer 123*d* may be spaced a predetermined distance from each other. That is, the second negative electrode coating layer 123*b* and the fourth negative electrode coating layer 123*d* may be spaced apart from each other on the second surface 121*ay* of the negative electrode current collector 121*a*, and a second negative electrode non-coating portion 121*b*, on which the negative electrode coating layer 123 is not formed, may be provided on the second surface 121*ay* of the negative electrode current collector 121*a*. Here, the first negative electrode non-coating portion 121*b* and the second negative electrode non-coating portion 121*b* may be provided at the same position with respect to the negative electrode current collector 121*a*. That is, the negative electrode current collector 121*a* may include a second negative electrode non-coating portion 121*b* on a surface that is opposite to the first surface 121*ax* on which the first negative electrode non-coating portion 121*b* is formed.

In addition, the first negative electrode coating layer 123*a* and the second negative electrode coating layer 123*b* may include two or more coating layer patterns, respectively. When two coating layer patterns are provided, the two coating layer patterns, i.e., the pattern adjacent to the front end Ra and the pattern adjacent to the rear end Rb may be spaced apart from each other.

The negative electrode tab 126 may be attached to any one of the first negative electrode non-coating portion 121*b* of the first surface 121*ax* and the second negative electrode non-coating portion 121*b* of the second surface 121*ay* in the negative electrode current collector 121*a*. Although FIG. 2 illustrates a state in which the negative electrode tab 126 is attached to the first negative electrode non-coating portion 121*b* of the negative electrode current collector 121*a*, in the present invention, the surface to which the negative electrode tab 126 is attached is not limited thereto. The negative electrode tab 126 may be partially welded and attached to the negative electrode current collector 121*a* and protrude downward by a predetermined length in the longitudinal direction of the electrode assembly 120.

The negative electrode tab 126 may be disposed at an approximate center of a cross-sectional radius r, which is a length between a winding center c and the outermost portion o, in a cross-section of the wound electrode assembly 120. Additionally, the negative electrode tab 126 may be disposed on the first surface 121*ax* or the second surface 121*ay* of the end area adjacent to the front end Ra or the rear end Rb of the negative electrode current collector 121*a*. The negative electrode tab 126 may be made of a copper or nickel material, but the present invention is not limited thereto. Additionally, the front end Ra may be adjacent to the winding center c in the wound electrode assembly 120, and the rear end Rb may be disposed at the outermost portion o in the wound electrode assembly 120. Of course, the non-coating portion on which the negative electrode coating layer 123 is not formed may be provided on the negative electrode current collector 121*a* on which the negative electrode tab 126 is disposed.

The positive electrode plate 122 is coated with a positive electrode coating layer 124 that is an active material made of a transition metal oxide on both surfaces of the positive electrode current collector 122*a*, which is plate-shaped metal foil made of aluminum (Al).

The positive electrode coating layer 124 may include a first positive electrode coating layer 124*a* formed on a front end area X of a first surface 122*ax* of the positive electrode current collector 122*a*, a second positive electrode coating layer 124*b* formed on a front end area X of a second surface 122*ay* opposite to the first surface 122*ax*, a third positive electrode coating layer 124*c* formed on a rear end area Y of the first surface 122*ax* of the positive electrode current collector 122*a*, and a fourth positive electrode coating layer 124*d* formed on the rear end area Y of the second surface 122*ay*.

A loading level of the first positive electrode coating layer 124*a* may be greater than or equal to that of the second positive electrode coating layer 124*b*. Also, a loading level of the third positive electrode coating layer 124*c* may be greater than or equal to that of the fourth positive electrode coating layer 124*d*.

In addition, the sum of the loading level of the first positive electrode coating layer 124*a* and the loading level of the second positive electrode coating layer 124*b* may be greater than or equal to that of the loading level of the third positive electrode coating layer 124*c* and the loading level of the fourth positive electrode coating layer 124*d*.

The first positive electrode coating layer 124*a*, the second positive electrode coating layer 124*b*, the third positive electrode coating layer 124*c*, and the fourth positive electrode coating layer 124*d* may be maintained to a minimum ratio in capacity of the positive electrode to the positive electrode so as to minimize an amount of lithium precipitation according to the number of turns of the wound electrode assembly 120. As described above, a ratio in capacity of the negative electrode to the positive electrode may be optimally maintained according to the number of turns of the electrode assembly 120 to improve efficiency to the capacity of the electrode assembly 120. The above-described loading level of the positive electrode coating layer 124 will be described in detail below.

Also, the first positive electrode coating layer 124*a* and the third positive electrode coating layer 124*c* may be spaced a predetermined distance from each other. That is, the first positive electrode coating layer 124*a* and the third positive electrode coating layer 124*c* may be spaced apart from each other on the first surface 122*ax* of the positive electrode current collector 122*a*, and a first positive electrode non-coating portion 122*b*, on which the positive electrode coating layer 124 is not formed, may be provided on the first surface 122*ax* of the positive electrode current collector 122*a*.

Also, the second positive electrode coating layer 124*b* and the fourth positive electrode coating layer 124*d* may be spaced a predetermined distance from each other. That is, the second positive electrode coating layer 124*b* and the fourth positive electrode coating layer 124*d* may be spaced apart from each other on the second surface 122*ay* of the positive electrode current collector 122*a*, and a second positive electrode non-coating portion 122*b*, on which the positive electrode coating layer 124 is not formed, may be provided on the second surface 122*ay* of the positive electrode current collector 122*a*. Here, the first positive electrode non-coating portion 122*b* and the second positive electrode non-coating portion 122*b* may be provided at the same position with respect to the positive electrode current collector 122*a*. That is, the positive electrode current collector 122*a* may include a second positive electrode non-coating portion 122*b* on a surface that is opposite to the first surface 122*ax* on which the first positive electrode non-coating portion 122*b* is formed.

In addition, the first positive electrode coating layer 124*a* and the second positive electrode coating layer 124*b* may include two or more coating layer patterns, respectively. When two coating layer patterns are provided, the two coating layer patterns, i.e., the pattern adjacent to the front end Ra and the pattern adjacent to the rear end Rb may be spaced apart from each other.

The positive electrode tab 127 may be attached to any one of the first positive electrode non-coating portion 122*b* of the first surface 122*ax* and the second positive electrode non-coating portion 122*b* of the second surface 122*ay* in the positive electrode current collector 122*a*. Although FIG. 2 illustrates a state in which the positive electrode tab 127 is attached to the first positive electrode non-coating portion 122*b* of the positive electrode current collector 122*a*, in the present invention, the surface to which the positive electrode tab 127 is attached is not limited thereto. The positive electrode tab 127 may be partially welded and attached to the positive electrode current collector 122*a* and protrude downward by a predetermined length in the longitudinal direction of the electrode assembly 120.

The positive electrode tab 127 may be disposed at the approximate center of the cross-sectional radius r, which is a length between the winding center c and the outermost portion o, in the cross-section of the wound electrode assembly 120. Additionally, the positive electrode tab 126 may be disposed on the first surface 122*ax* or the second surface 122*ay* of the end area adjacent to the front end Ra or the rear end Rb of the positive electrode current collector 122*a*. Of course, the non-coating portion on which the positive electrode coating layer 124 is not formed may be provided on the positive electrode current collector 122*a* on which the positive electrode tab 126 is disposed. The positive electrode tab 127 may be made of an aluminum material, but the present invention is not limited thereto.

In addition, the negative electrode tab 126 and the positive electrode tab 127 may be disposed on the same surface of the wound negative and positive electrode plates 121 and 122 and may be disposed on opposite surfaces of the negative electrode plate 121 and the positive electrode plate 122. Here, the same surface may be a surface facing the winding center c in the wound electrode assembly 120 in the same manner or may be a surface facing the outermost portion o in the same manner.

Hereinafter, the first surface 121*ax* of the negative current collector 121*a* and the first surface 122*ax* of the positive electrode current collector 122*a*, which face the outermost portion o of the wound electrode assembly 120, will be referred to as outer surfaces, and the second surface 121*ay* of the negative electrode current collector 121*a* and the second surface 122*ay* of the positive electrode current collector 122*a*, which face the winding center c, will be referred to as inner surfaces 122*ay*.

In addition, when the opposite surface is attached to the outer surface 122*ax* of the positive electrode current collector 122*a* of the positive electrode tab 127 in the wound electrode assembly 120, it means that the negative electrode tab 126 is formed on the inner surface 121*ay*, or vice versa. That is, in the present invention, the surfaces to which the negative electrode tab 126 and the positive electrode tab 127 are attached are not limited to both surfaces of the negative electrode plate 121 and the positive electrode plate 122, each of which is made of foil.

Also, the negative electrode tab 124 of the electrode assembly 120 may be welded to the bottom portion 111 of the case 110. Accordingly, the case 110 may operate as a negative electrode. Of course, on the contrary, the positive electrode tab 125 may be welded to the bottom portion 111 of the can 110, and in this case, the can 110 may operate as a positive electrode.

In addition, a first insulating plate 128 coupled to the case 110 and having a first hole 128*a* at a center thereof and a second hole 128*b* formed in the outside thereof may be interposed between the electrode assembly 120 and the bottom portion 111. The first insulating plate 128 serves to prevent the electrode assembly 120 from being in electrical contact with the bottom portion 111 of the case 110. Particularly, the first insulating plate 128 serves to prevent the positive electrode plate 122 of the electrode assembly 120 from electrically contacting the bottom portion 111. Here, the first hole 128*a* serves to allow a gas to quickly move upward when a large amount of gas is generated due to abnormality in the secondary battery, and the second hole 128*b* serves to allow the negative electrode tab 124 to pass therethrough so as to be welded to the bottom portion 111. Additionally, the electrode assembly 120 is further provided with a center pin (not shown) in the form of a hollow circular pipe at an approximate center so that a large amount of gas generated when the secondary battery is abnormal is easily discharged through an inner passage of the center pin.

In addition, a second insulating plate 129 coupled to the can 110 and having a first hole 129*a* at a center thereof and a plurality of second holes 129*b* formed in the outside thereof may be interposed between the electrode assembly 120 and the bottom portion 130. The second insulating plate 129 serves to prevent the electrode assembly 120 from electrically contacting the cap assembly 130. Particularly, the second insulating plate 129 serves to prevent the negative electrode plate 121 of the electrode assembly 120 from electrically contacting the cap assembly 130. Here, the first hole 129a serves to allow a gas to quickly move to the cap assembly 130 when a large amount of gas is generated due to abnormality in the secondary battery, and the second hole 129b serves to allow the positive electrode tab 125 to pass therethrough so as to be welded to the cap assembly 130. In addition, the remaining second hole 129b serves to allow the electrolyte to quickly flow into the electrode assembly 120 during a process of injecting the electrolyte. The electrolyte serves as a movement medium for the lithium ions generated by electrochemical reaction in the positive and negative plates inside the battery during charging and discharging.

The cap assembly 130 may include a cap-up 131 having a plurality of through-holes 131d, a safety plate 133 installed on a lower portion of the cap-up 131, a connecting ring 135 installed on a lower portion of the safety plate 133, a cap-down 136 coupled to the connecting ring 135 and having first and second through-holes 136a and 146b, a sub-plate 137 fixed to a lower portion of the cap-down 136 and electrically connected to the positive electrode tab 125, and an insulating gasket 138 that insulates the cap-up 131, the safety plate 133, the connecting ring 135, and the cap-down 136 from a side portion 111 of the case 110.

Here, the insulating gasket 138 is substantially compressed between a beading part 113, which is formed on the side portion of the case 110, and the crimping part 114. In addition, the through-hole 131d formed in the cap-up 131 and the through-hole 136b formed in the cap-down 136 serve to discharge the internal gas to the outside when an abnormal internal pressure occurs inside the case 110. Of course, the safety plate 133 is electrically separated from the sub-plate 137 as it is inverted upward by this internal pressure, and then, the safety plate 133 is torn to discharge the internal gas to the outside.

Hereinafter, various embodiments of the loading level of the negative electrode coating layer 123 and the loading level of the positive electrode coating layer 124, through which a minimum ratio in capacity of the negative electrode to the positive electrode is maintained to minimize the lithium precipitation, and an amount of output to the capacity is maximized, in the electrode assembly 120 of the present invention will be described together with Comparative example. Here, the ratio in capacity of the negative electrode to the positive electrode to minimize the lithium precipitation may be about 1.05, but the present invention is not limited thereto. In addition, the case in which the ratio in capacity of the negative electrode to the positive electrode is 1.05 means a case, when the capacity of the positive electrode coating layer 124 is 1, the capacity of the negative electrode coating layer 123 is 1.05.

COMPARATIVE EXAMPLE

Loading levels of a first negative electrode coating layer 123a and a third negative electrode coating layer 123c are the same as A1, and loading levels of a second negative electrode coating layer 123b and a fourth negative electrode coating layer 123d are the same as B1 and less than A1. That is, the loading level of the negative electrode coating layer 123 formed on an inner surface 121ay of a negative electrode current collector 121a may be constant, and the loading level of the negative electrode coating layer 123 formed on an outer surface 121ax of the negative electrode collector 121a may be constant.

Loading levels of a first positive electrode coating layer 124a and a third positive electrode coating layer 124c are the same as A2, and loading levels of a second positive electrode coating layer 124b and a fourth positive electrode coating layer 124d are the same as B2 and less than A2. That is, the loading level of the positive electrode coating layer 124 formed on an inner surface 122ay of a positive electrode current collector 122a may be constant, and the loading level of the positive electrode coating layer 124 formed on an outer surface 122ax of the positive electrode collector 122a may be constant.

For example, the loading levels of the negative electrode coating layer 123 and the positive electrode coating layer 124 according to Comparative Example may be as shown in Table 1.

TABLE 1

| | Kinds | Loading level | Sum |
|---|---|---|---|
| Positive electrode | First positive electrode coating layer (124a) | 15.30 | 30.00 |
| | Second positive electrode coating layer (124b) | 14.70 | |
| | Third positive electrode coating layer (124c) | 15.30 | 30.00 |
| | Fourth positive electrode coating layer (124d) | 14.70 | |
| Negative electrode | First negative electrode coating layer (123a) | 15.64 | 30.67 |
| | Second negative electrode coating layer (123b) | 15.03 | |
| | Third negative electrode coating layer (123c) | 15.64 | 30.67 |
| | Fourth negative electrode coating layer (123d) | 15.03 | |

Figure 3:
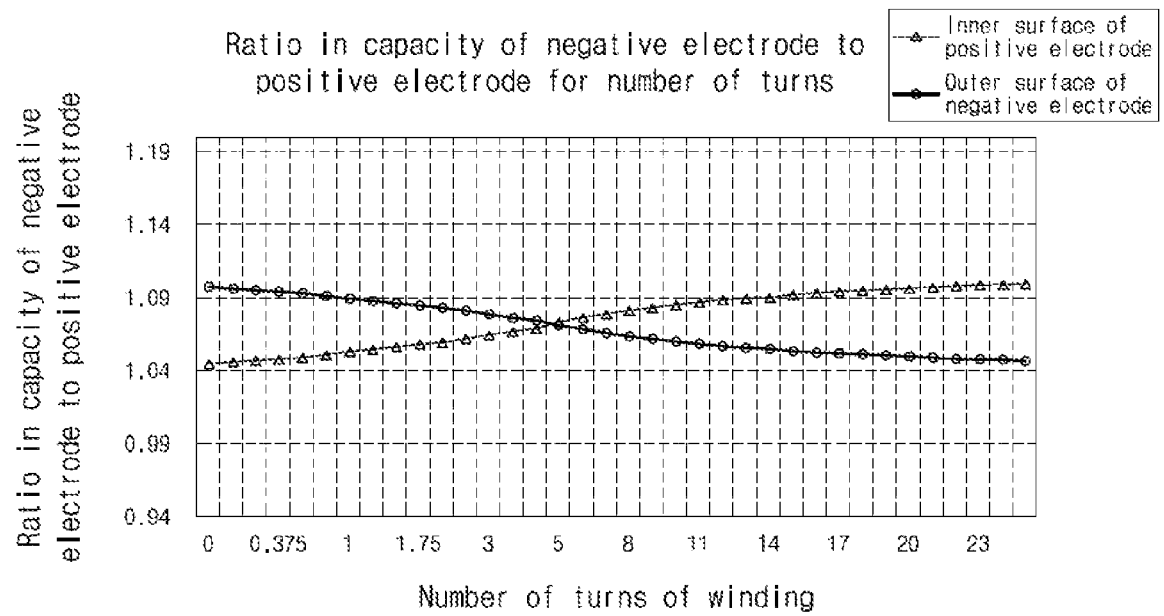
FIG. 3 is a view illustrating results of a ratio in capacity of a negative electrode to a positive electrode depending on the number of turns of winding of the electrode assembly according to Comparative Example of the present invention.

In addition, when the loading levels of the positive electrode coating layer 124 and the negative electrode coating layer 123 are as shown in Table 1, a ratio in capacity of the negative electrode to the positive electrode on the inner surface 122ay of the positive electrode current collector plate 122a and a ratio in capacity of the negative electrode to the positive electrode on the outer surface 122az of the positive electrode current collector 122a may be the same as in FIG. 3 according to the number of turns of winding of the electrode assembly 120. As illustrated in FIG. 3, in the electrode assembly 120 manufactured to have the same loading level as in Comparative Example, it is seen that all of a ratio in capacity of the negative electrode to the positive electrode on the inner surface 122ay of the positive electrode current collector 122a and a ratio in capacity of the negative electrode to the positive electrode on the outer surface 122az of the positive electrode current collector 122a from a winding front end Ra to a winding rear end Rb are greater than a minimum ratio in capacity of the negative electrode to the positive electrode, at which the lithium precipitation is prevented from occurring.

However, in the electrode assembly 120 as in Comparative Example, it is seen that the ratio in capacity of the negative electrode to the positive electrode on the inner surface 122ay of the positive electrode current collector 122a from the number of turns of five times or more of winding to the winding rear end Rb exceeds the minimum ratio in capacity of the negative electrode to the positive electrode to continuously increase. This means that, as the number of turns of winding of the electrode assembly 120 increases, the negative electrode coating layer 123 has an unnecessarily large capacity compared to the positive electrode coating layer 124 to reduce an amount of output to the capacity of the electrode assembly 120. Of course, in the electrode assembly 120 as in Comparative Example, the ratio in capacity of the negative electrode to the positive electrode exceeds the minimum ratio in capacity of the negative electrode to the positive electrode on the outer surface 122az of the positive electrode current collector 122a from a winding front end Ra to the number of turns of five times or less of winding. However, in the electrode assembly 120 of the cylindrical battery, since the capacities of the positive electrode coating layer 124 and the negative electrode coating layer 123 gradually increase as the number of turns of winding increases from the winding front end Ra, even if the ratio in capacity of the negative electrode to the positive electrode is large at the beginning of winding, it is seen as a negligible very small amount compared to the unnecessary excessive capacity of the negative electrode coating layer 123 in the latter half of winding.

Embodiment 1

Like Comparative Example, a loading level of a negative electrode coating layer 123 formed on an inner surface 121ay of a negative electrode current collector 121a may be constant, and a loading level of a negative electrode coating layer 123 formed on an outer surface 121ax of the negative electrode current collector 121a may be constant. Here, a first negative electrode coating layer 123a and a third negative electrode coating layer 123c may be integrally formed, and a second negative electrode coating layer 123b and a fourth negative electrode coating layer 123d may be integrally formed. Of course, in this case, a negative electrode tab 126 may form a non-coating portion on an area adjacent to a front end Ra or a rear end Rb of the negative electrode current collector 121a and may be attached to the non-coating portion.

The loading level of the first positive electrode coating layer 124a is A2, and the loading level of the second positive electrode coating layer 124b is B2, which is less than A2. The loading levels of the third positive electrode coating layer 124c and the fourth positive electrode coating layer 124d may be the same as C2 and may be less than A2 and larger than B2. That is, the loading level of the third positive electrode coating layer 124c may be less than that of the first positive electrode coating layer 124a formed on the same surface of the negative electrode current collector 121a, and the loading level of the fourth positive electrode coating layer 124d may be greater than that of the second positive electrode coating layer 124b formed on the same surface of the negative electrode current collector 121a.

That is, the loading level of the positive electrode coating layer 124 on a front end area X may be similar to that in Comparative Example, and the loading level of the positive electrode coating layer 124 on a rear end area Y may be adjusted to increase in an amount of output to the capacity of the electrode assembly 120.

For example, the loading levels of the negative electrode coating layer 123 and the positive electrode coating layer 124 of the electrode assembly 120 as in Embodiment 1 may be as shown in Table 2. As shown in Table 2, the sum of the loading level of the first positive electrode coating layer 124a and the loading level of the second positive electrode coating layer 124b may be the same as that of the loading level of the third positive electrode coating layer 124c and the loading level of the fourth positive electrode coating layer 124d.

TABLE 2

| | Kinds | Loading level | Sum |
|---|---|---|---|
| Positive electrode | First positive electrode coating layer (124a) | 15.36 | 30.06 |
| | Second positive electrode coating layer (124b) | 14.70 | |
| | Third positive electrode coating layer (124c) | 15.00 | 30.06 |
| | Fourth positive electrode coating layer (124d) | 15.06 | |
| Negative electrode | First negative electrode coating layer (123a) | 15.64 | 30.67 |
| | Second negative electrode coating layer (123b) | 15.03 | |
| | Third negative electrode coating layer (123c) | 15.64 | 30.67 |
| | Fourth negative electrode coating layer (123d) | 15.03 | |

Figure 4:
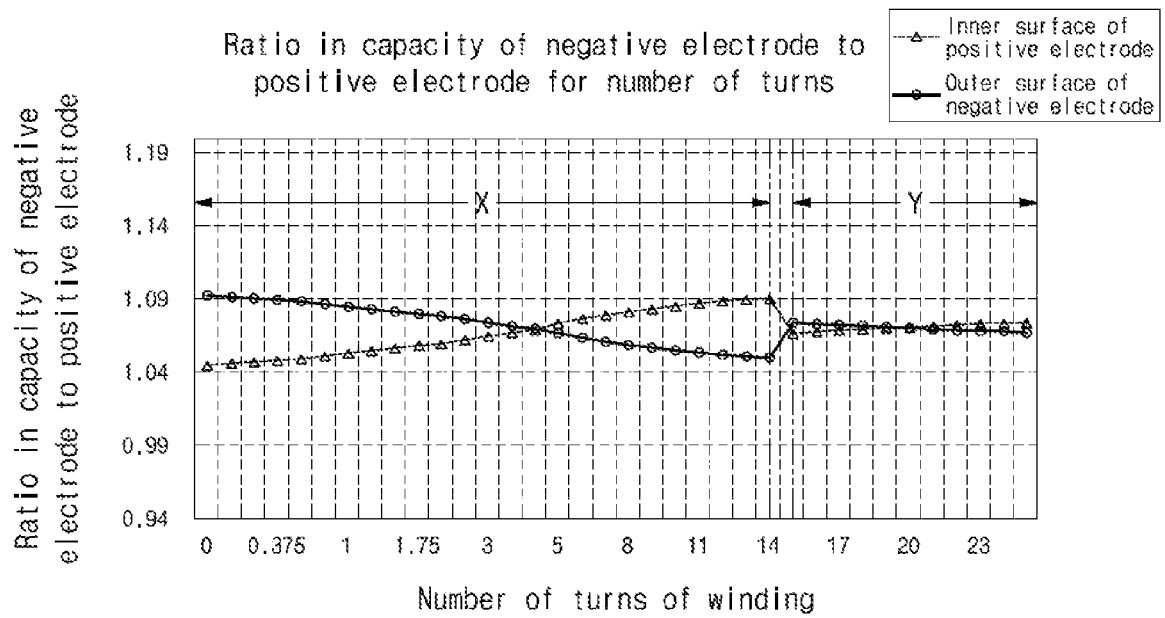
FIG. 4 is a view illustrating results of a ratio in capacity of a negative electrode to a positive electrode depending on the number of turns of winding of the electrode assembly according to an example of Embodiment 1 of the present invention.

In addition, when the loading levels of the positive electrode coating layer 124 and the negative electrode coating layer 123 are as shown in Table 2, a ratio in capacity of the negative electrode to the positive electrode on the inner surface 122ay of the positive electrode current collector plate 122a and a ratio in capacity of the negative electrode to the positive electrode on the outer surface 122az of the positive electrode current collector 122a may be the same as in FIG. 4 according to the number of turns of winding of the electrode assembly 120. As illustrated in FIG. 4, in the electrode assembly 120 manufactured to have the same loading level as that in one example (Table 2) of Embodiment 1, a ratio in capacity of the negative electrode to the positive electrode on the inner surface 122ay of the positive electrode current collector 122a on the front end area X and a ratio in capacity of the negative electrode to the positive electrode on the outer surface 122az of the positive electrode current collector 122a on the front end area X are the same as those in Comparative Example.

As illustrated in FIG. 4, in the electrode assembly 120 manufactured to have the same loading level as that in one example (Table 2) of Embodiment 1, it is seen that a ratio in capacity of the negative electrode to the positive electrode on the inner surface 122ay of the positive electrode current collector 122a on the front end area X decreases compared to Comparative Example, and a ratio in capacity of the negative electrode to the positive electrode on the outer surface 122az of the positive electrode current collector 122a on the front end area X increases compared to Comparative Example.

That is, in the electrode assembly 120 manufactured to have the same loading level as in an example (Table 2) of Embodiment 1, the loading level of the positive electrode coating layer 124 on the rear end area Y may be adjusted so that the ratio in capacity of the negative electrode to the positive electrode is similar to the minimum ratio in capacity of the negative electrode to the positive electrode.

Therefore, in the electrode assembly 120 as in Embodiment 1, the capacity of the negative electrode coating layer 123 may be prevented from unnecessarily increasing on the rear end area Y, and an amount of output to the capacity of the electrode assembly 120 may further increase compared to Comparative Example.

In Table 2, although the third anode coating layer 124c and the fourth anode coating layer 124d have a numerical difference at two places of decimals, such a difference (less than 0.05) may be regarded as the same loading level in the present invention.

Also, as another example of Embodiment 1, the loading levels of the negative electrode coating layer 123 and the positive electrode coating layer 124 of the electrode assembly 120 may be as shown in Table 3. As shown in Table 3, the sum of the loading level of the first positive electrode coating layer 124a and the loading level of the second positive electrode coating layer 124b may be less than that of the loading level of the third positive electrode coating layer 124c and the loading level of the fourth positive electrode coating layer 124d.

TABLE 3

|  | Kinds | Loading level | Sum |
|---|---|---|---|
| Positive electrode | First positive electrode coating layer (124a) | 15.36 | 30.06 |
|  | Second positive electrode coating layer (124b) | 14.70 |  |
|  | Third positive electrode coating layer (124c) | 15.26 | 30.56 |
|  | Fourth positive electrode coating layer (124d) | 15.30 |  |
| Negative electrode | First negative electrode coating layer (123a) | 15.64 | 30.67 |
|  | Second negative electrode coating layer (123b) | 15.03 |  |
|  | Third negative electrode coating layer (123c) | 15.64 | 30.67 |
|  | Fourth negative electrode coating layer (123d) | 15.03 |  |

Figure 5:
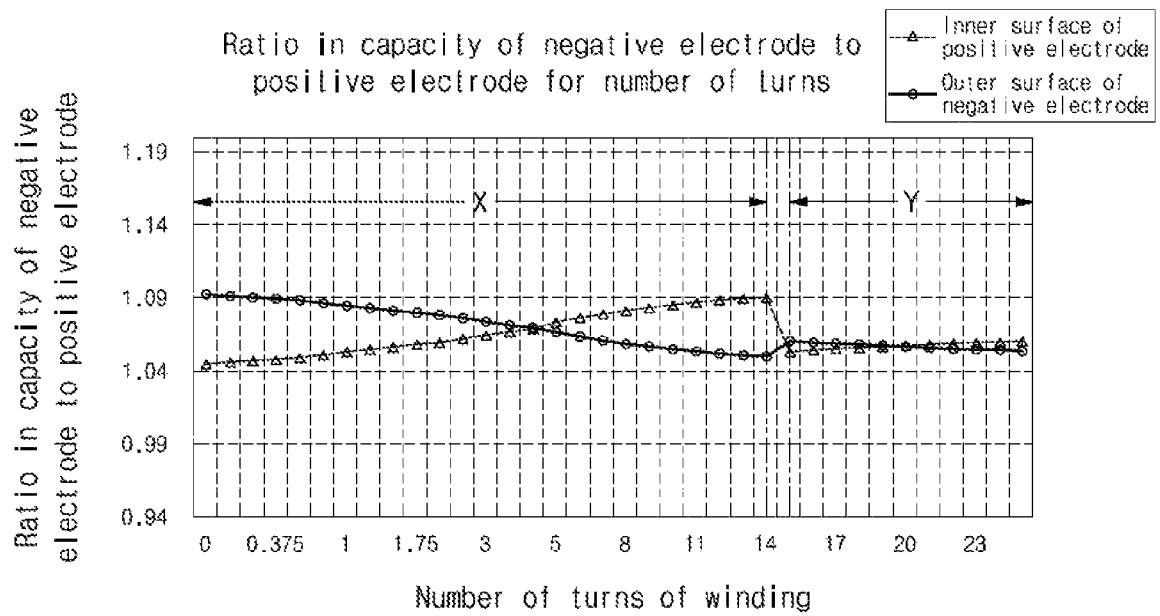
FIG. 5 is a view illustrating results of a ratio in capacity of a negative electrode to a positive electrode depending on the number of turns of winding of the electrode assembly according to another example of Embodiment 1 of the present invention.

In addition, when the loading levels of the positive electrode coating layer 124 and the negative electrode coating layer 123 are as shown in Table 3, a ratio in capacity of the negative electrode to the positive electrode on the inner surface 122ay of the positive electrode current collector plate 122a and a ratio in capacity of the negative electrode to the positive electrode on the outer surface 122az of the positive electrode current collector 122a may be the same as in FIG. 5 according to the number of turns of winding of the electrode assembly 120. When comparing the example (Table 2) to Table 3 of Embodiment 1, Table 2 and Table 3 are the same except that the loading level of the third positive electrode coating layer 124c and the loading level of the fourth positive electrode coating layer 124d are changed so that the same of the loading levels is greater than that of the loading level of the first positive electrode coating layer 124a and the loading level of the second positive electrode coating layer 124b. As illustrated in FIG. 5, when the sum of the loading level of the third positive electrode coating layer 124c and the loading level of the fourth positive electrode coating layer 124d is greater than that of the first positive electrode coating layer 124a and the second positive electrode coating layer 124b, it is seen that the ratio in capacity of the negative electrode to the positive electrode the inner surface 122ay of the positive electrode current collector 122a on the rear end area Y and the ratio in capacity of the negative electrode to the positive electrode the outer surface 122az of the positive electrode current collector 122a on the rear end area Y further decrease compared to the example (Table 2 in FIG. 4) of Embodiment 1. That is, in the electrode assembly 120 as in another example (Table 3) of Embodiment 1, the loading level of the positive electrode coating layer 124 on the rear end area Y is set to be greater than the loading level of the positive electrode coating layer 124 on the front end area X so that the ratio in capacity of the negative electrode to the positive electrode is similar to the minimum ratio in capacity for preventing the lithium precipitation. In the electrode assembly 120 according to another example (Table 3) of Embodiment 1 as described above, the capacity of the negative electrode coating layer 123 may be prevented from unnecessarily increasing, and the amount of output to the capacity of the electrode assembly 120 may further increase compared to the example of (Table 2) of Embodiment 1.

Embodiment 2

A loading level of a first negative electrode coating layer 123a is A2, and a loading level of a second negative electrode coating layer 123b is B2, which is less than A2. Loading levels of a third negative electrode coating layer 124c and a fourth negative electrode coating layer 124d may be the same as C2, but may be less than A2 and larger than B2. That is, the loading level of the third negative electrode coating layer 123c may be less than that of the first negative electrode coating layer 123a formed on the same surface of a negative electrode current collector 121a, and the loading level of the fourth negative electrode coating layer 123d may be greater than that of the second negative electrode coating layer 123b formed on the same surface of the negative electrode current collector 121a.

That is, the loading level of the negative electrode coating layer 123 on a front end area X may be similar to that in Comparative Example, and the loading level of the negative electrode coating layer 123 on a rear end area Y may be adjusted to increase in an amount of output to the capacity of the electrode assembly 120.

Like Comparative Example, a loading level of a positive electrode coating layer 124 formed on an inner surface 122ay of a positive electrode current collector 122a may be constant, and a loading level of a positive electrode coating layer 124 formed on an outer surface 122az of the positive electrode current collector 122a may be constant. Here, a first positive electrode coating layer 124a and a third positive electrode coating layer 124c may be integrally formed, and a second positive electrode coating layer 124b and a fourth positive electrode coating layer 124d may be integrally formed. Of course, in this case, a positive electrode tab 126 may form a non-coating portion on an area adjacent to a front end Ra or a rear end Rb of the positive electrode current collector 122a and may be attached to the non-coating portion.

For example, the loading levels of the negative electrode coating layer 123 and the positive electrode coating layer 124 of the electrode assembly 120 as in Embodiment 2 may be as shown in Table 4. As shown in Table 2, the sum of the loading level of the first negative electrode coating layer 123a and the loading level of the second negative electrode coating layer 123b may be the same as that of the loading level of the third negative electrode coating layer 123c and the loading level of the fourth negative electrode coating layer 123d.

TABLE 4

| | Kinds | Loading level | Sum |
|---|---|---|---|
| Positive electrode | First positive electrode coating layer (124a) | 15.30 | 30.00 |
| | Second positive electrode coating layer (124b) | 14.70 | |
| | Third positive electrode coating layer (124c) | 15.30 | 30.00 |
| | Fourth positive electrode coating layer (124d) | 14.70 | |
| Negative electrode | First negative electrode coating layer (123a) | 15.64 | 30.61 |
| | Second negative electrode coating layer (123b) | 14.97 | |
| | Third negative electrode coating layer (123c) | 15.28 | 30.61 |
| | Fourth negative electrode coating layer (123d) | 15.33 | |

Figure 6:
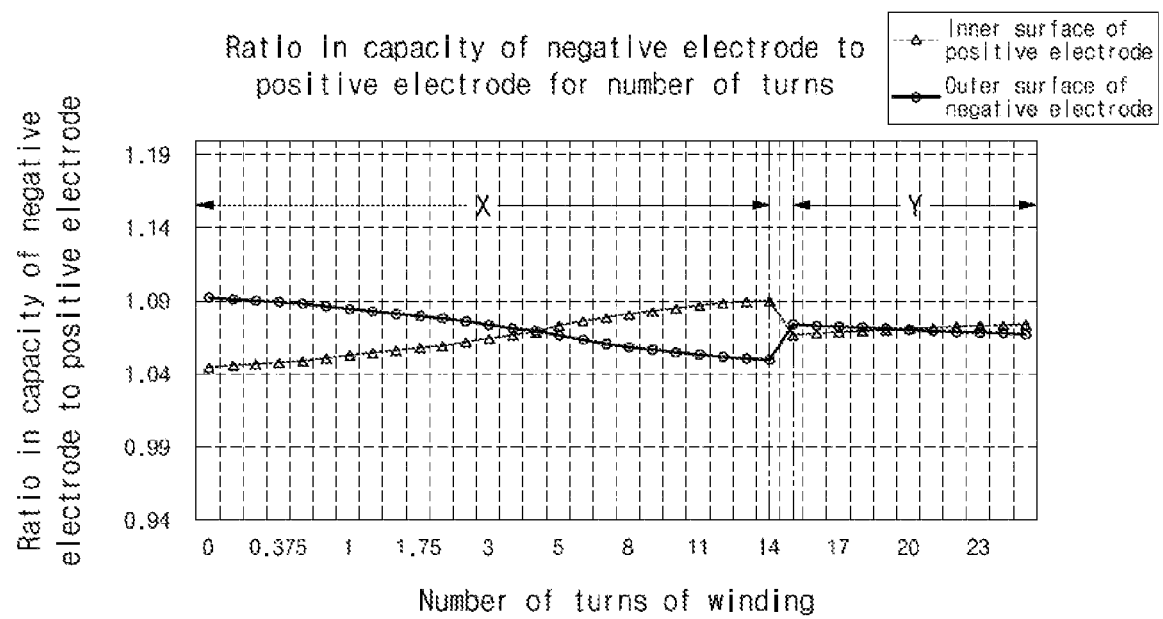
FIG. 6 is a view illustrating results of a ratio in capacity of a negative electrode to a positive electrode depending on the number of turns of winding of the electrode assembly according to an example of Embodiment 2 of the present invention.

In addition, when the loading levels of the positive electrode coating layer 124 and the negative electrode coating layer 123 are as shown in Table 4, a ratio in capacity of the negative electrode to the positive electrode on the inner surface 122ay of the positive electrode current collector plate 122a and a ratio in capacity of the negative electrode to the positive electrode on the outer surface 122az of the positive electrode current collector 122a may be the same as in FIG. 6 according to the number of turns of winding of the electrode assembly 120. As illustrated in FIG. 6, in the electrode assembly 120 manufactured to have the same loading level as that in one example (Table 4) of Embodiment 2, a ratio in capacity of the negative electrode to the positive electrode on the inner surface 122ay of the positive electrode current collector 122a on the front end area X and a ratio in capacity of the negative electrode to the positive electrode on the outer surface 122az of the positive electrode current collector 122a on the front end area X are the same as those in Comparative Example.

As illustrated in FIG. 6, in the electrode assembly 120 manufactured to have the same loading level as that in one example (Table 4) of Embodiment 2, it is seen that a ratio in capacity of the negative electrode to the positive electrode on the inner surface 122ay of the positive electrode current collector 122a on the front end area X decreases compared to Comparative Example, and a ratio in capacity of the negative electrode to the positive electrode on the outer surface 122az of the positive electrode current collector 122a on the front end area X increases compared to Comparative Example. That is, in the electrode assembly 120 manufactured to have the same loading level as in an example (Table 4) of Embodiment 2, the loading level of the negative electrode coating layer 123 in the rear end area Y may be adjusted so that the ratio in capacity of the negative electrode to the positive electrode is similar to the minimum ratio in capacity of the negative electrode to the positive electrode.

That is, in the electrode assembly 120 as in Embodiment 2, the loading level of the negative electrode coating layer 123 on the rear end area Y may be adjusted to prevent the capacity of the negative electrode coating layer 123 from unnecessarily increasing, and thus, an amount of output to the capacity of the electrode assembly 120 may further increase compared to Comparative Example.

Also, as another example of Embodiment 2, the loading levels of the negative electrode coating layer 123 and the positive electrode coating layer 124 of the electrode assembly 120 may be as shown in Table 5. As shown in Table 2, the sum of the loading level of the first negative electrode coating layer 123a and the loading level of the second negative electrode coating layer 123b may be less than that of the loading level of the third negative electrode coating layer 123c and the loading level of the fourth negative electrode coating layer 123d.

TABLE 5

| | Kinds | Loading level | Sum |
|---|---|---|---|
| Positive electrode | First positive electrode coating layer (124a) | 15.30 | 30.00 |
| | Second positive electrode coating layer (124b) | 14.70 | |
| | Third positive electrode coating layer (124c) | 15.30 | 30.00 |
| | Fourth positive electrode coating layer (124d) | 14.70 | |
| Negative electrode | First negative electrode coating layer (123a) | 15.64 | 30.61 |
| | Second negative electrode coating layer (123b) | 14.97 | |
| | Third negative electrode coating layer (123c) | 15.08 | 30.21 |
| | Fourth negative electrode coating layer (123d) | 15.13 | |

Figure 7:
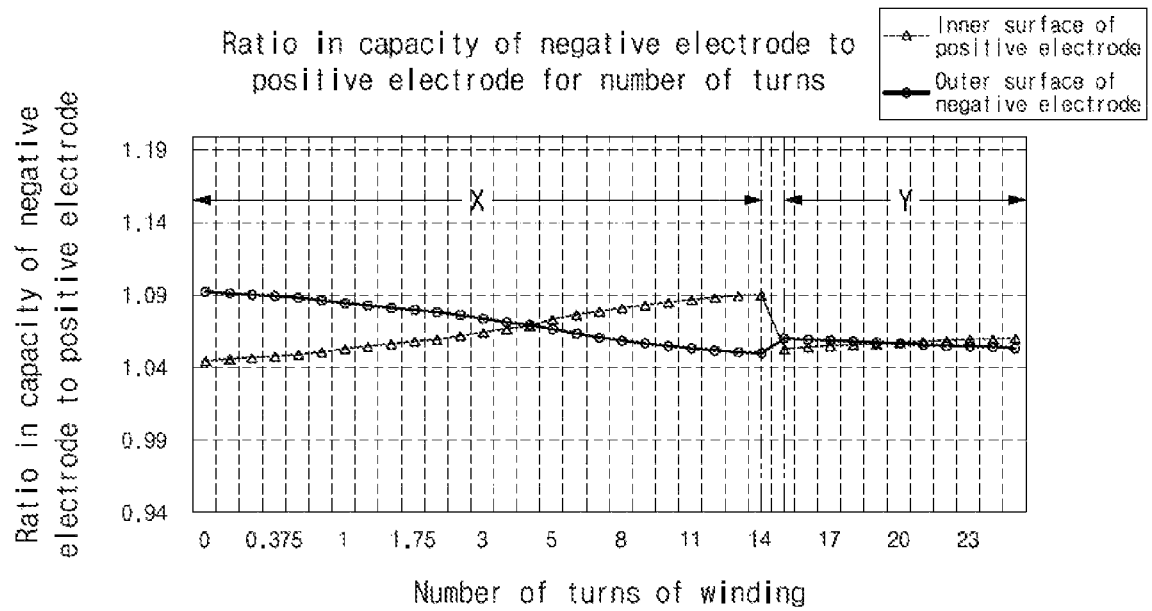
FIG. 7 is a view illustrating results of a ratio in capacity of a negative electrode to a positive electrode depending on the number of turns of winding of the electrode assembly according to another example of Embodiment 2 of the present invention.

In addition, when the loading levels of the positive electrode coating layer 124 and the negative electrode coating layer 123 are as shown in Table 5, a ratio in capacity of the negative electrode to the positive electrode on the inner surface 122ay of the positive electrode current collector plate 122a and a ratio in capacity of the negative electrode to the positive electrode on the outer surface 122az of the positive electrode current collector 122a may be the same as in FIG. 7 according to the number of turns of winding of the electrode assembly 120. When comparing the example (Table 4) to Table 5 of Embodiment 2, Table 4 and Table 5 are the same except that the loading level of the third negative electrode coating layer 123c and the loading level of the fourth negative electrode coating layer 123d are changed so that the same of the loading levels is less than that of the loading level of the first negative electrode coating layer 123a and the loading level of the second negative electrode coating layer 123b. As illustrated in FIG. 7, when the sum of the loading level of the third negative electrode coating layer 123c and the loading level of the fourth negative electrode coating layer 123d is less than that of the first negative electrode coating layer 123a and the second negative electrode coating layer 123b, it is seen that the ratio in capacity of the negative electrode to the negative electrode the inner surface 122ay of the negative electrode current collector 122a on the rear end area Y and the ratio in capacity of the negative electrode to the negative electrode the outer surface 122az of the negative electrode current collector 122a on the rear end area Y further decrease compared to the example (Table 2 in FIG. 4) of Embodiment 2. That is, in the electrode assembly 120 as in another example (Table 5) of Embodiment 2, the loading level of the negative electrode coating layer 123 on the rear end area Y is set to be less than the loading level of the negative electrode coating layer 123 on the front end area X so that the ratio in capacity of the negative electrode to the negative electrode is similar to the minimum ratio in capacity for preventing the lithium precipitation. In the electrode assembly 120 according to another example (Table 5) of Embodiment 2 as described above, the capacity of the negative electrode coating layer 123 may be prevented from unnecessarily increasing, and the amount of output to the capacity of the electrode assembly 120 may further increase compared to the example of (Table 4) of Embodiment 2.

Embodiment 3

A loading level of a first negative electrode coating layer 123*a* is A2, and a loading level of a second negative electrode coating layer 123*b* is B2, which is less than A2. A loading level of a third negative electrode coating layer 123*c* is C1, and a loading level of a fourth negative electrode coating layer 123*d* is D1, which is less than C1. In addition, the loading level B1 of the second negative electrode coating layer 123*b* may be less than the loading level D1 of the fourth negative electrode coating layer 123*d*, and the loading level A1 of the first negative electrode coating layer 123*a* may be greater than the loading level C1 of the third negative electrode coating layer 123*c*.

That is, the loading level of the negative electrode coating layer 123 on a front end area X may be similar to that in Comparative Example, and the loading level of the negative electrode coating layer 123 on a rear end area Y may be adjusted to increase in an amount of output to the capacity of the electrode assembly 120.

The loading level of the first positive electrode coating layer 124*a* is A2, and the loading level of the second positive electrode coating layer 124*b* is B2, which is less than A2. A loading level of a third positive electrode coating layer 124*c* is C2, and a loading level of a fourth positive electrode coating layer 124*d* is D2, which is less than C2. In addition, the loading level B2 of the second positive electrode coating layer 124*b* may be less than the loading level D2 of the fourth positive electrode coating layer 124*d*, and the loading level A2 of the first positive electrode coating layer 124*a* may be greater than or equal to the loading level C2 of the third positive electrode coating layer 124*c*.

That is, the loading level of the positive electrode coating layer 124 on a front end area X may be similar to that in Comparative Example, and the loading level of the positive electrode coating layer 124 on a rear end area Y may be adjusted to increase in an amount of output to the capacity of the electrode assembly 120.

For example, the loading levels of the negative electrode coating layer 123 and the positive electrode coating layer 124 of the electrode assembly 120 as in Embodiment 3 may be as shown in Table 6. As shown in Table 6, the sum of the loading level of the first negative electrode coating layer 123*a* and the loading level of the second negative electrode coating layer 123*b* may be the same as that of the loading level of the third negative electrode coating layer 123*c* and the loading level of the fourth negative electrode coating layer 123*d*. Also, the sum of the loading level of the first positive electrode coating layer 124*a* and the loading level of the second positive electrode coating layer 124*b* may be the same as that of the loading level of the third positive electrode coating layer 123*c* and the loading level of the fourth positive electrode coating layer 123*d*. Also, the loading level of the first positive electrode coating layer 124*a* may be greater than the loading level of the third positive electrode coating layer 124*c*.

TABLE 6

| | Kinds | Loading level | Sum |
|---|---|---|---|
| Positive electrode | First positive electrode coating layer (124a) | 15.40 | 30.13 |
| | Second positive electrode coating layer (124b) | 14.73 | |
| | Third positive electrode coating layer (124c) | 15.22 | 30.13 |
| | Fourth positive electrode coating layer (124d) | 14.91 | |
| Negative electrode | First negative electrode coating layer (123a) | 15.67 | 30.67 |
| | Second negative electrode coating layer (123b) | 15.00 | |
| | Third negative electrode coating layer (123c) | 15.46 | 30.67 |
| | Fourth negative electrode coating layer (123d) | 15.21 | |

Figure 8:
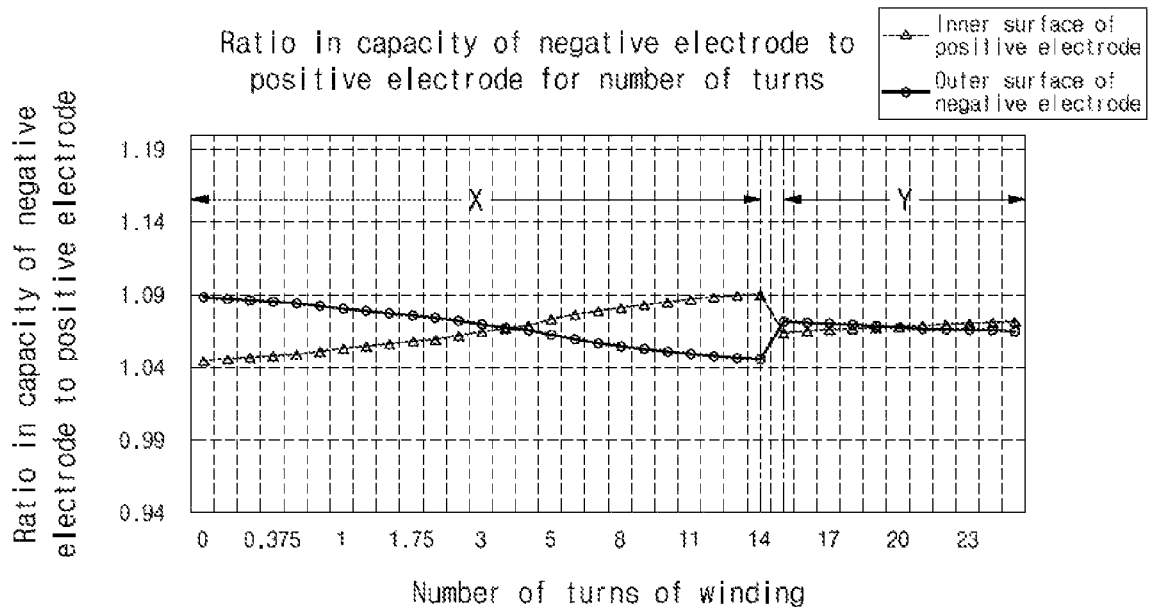
FIG. 8 is a view illustrating results of a ratio in capacity of a negative electrode to a positive electrode depending on the number of turns of winding of the electrode assembly according to an example of Embodiment 3 of the present invention.

In addition, when the loading levels of the positive electrode coating layer 124 and the negative electrode coating layer 123 are as shown in Table 6, a ratio in capacity of the negative electrode to the positive electrode on the inner surface 122*ay* of the positive electrode current collector plate 122*a* and a ratio in capacity of the negative electrode to the positive electrode on the outer surface 122*az* of the positive electrode current collector 122*a* may be the same as in FIG. 8 according to the number of turns of winding of the electrode assembly 120. As illustrated in FIG. 8, in the electrode assembly 120 manufactured to have the same loading level as that in one example (Table 6) of Embodiment 3, a ratio in capacity of the negative electrode to the positive electrode on the inner surface 122*ay* of the positive electrode current collector 122*a* on the front end area X and a ratio in capacity of the negative electrode to the positive electrode on the outer surface 122*az* of the positive electrode current collector 122*a* on the front end area X are the same as those in Comparative Example.

As illustrated in FIG. 8, in the electrode assembly 120 manufactured to have the same loading level as that in one example (Table 6) of Embodiment 3, it is seen that a ratio in capacity of the negative electrode to the positive electrode on the inner surface 122*ay* of the positive electrode current collector 122*a* on the front end area X decreases compared to Comparative Example, and a ratio in capacity of the negative electrode to the positive electrode on the outer surface 122*az* of the positive electrode current collector 122*a* on the front end area X increases compared to Comparative Example. That is, in the electrode assembly 120 manufactured to have the same loading level as in an example (Table 6) of Embodiment 3, the loading level of the negative electrode coating layer 123 and the loading level of the positive electrode coating layer 124 on the rear end area Y may be adjusted so that the ratio in capacity of the negative electrode to the positive electrode is similar to the minimum ratio in capacity of the negative electrode to the positive electrode.

That is, in the electrode assembly 120 as in Embodiment 3, the loading level of the negative electrode coating layer 123 and the loading level of the positive electrode coating layer 124 on the rear end area Y may be adjusted to prevent the capacity of the negative electrode coating layer 123 from unnecessarily increasing, and thus, an amount of output to the capacity of the electrode assembly 120 may further increase compared to Comparative Example.

Also, as another example of Embodiment 3, the loading levels of the negative electrode coating layer 123 and the positive electrode coating layer 124 of the electrode assembly 120 may be as shown in Table 7. As shown in Table 7, the sum of the loading level of the first negative electrode coating layer 123a and the loading level of the second negative electrode coating layer 123b may be the same as that of the loading level of the third negative electrode coating layer 123c and the loading level of the fourth negative electrode coating layer 123d. Also, the sum of the loading level of the first positive electrode coating layer 124a and the loading level of the second positive electrode coating layer 124b may be less than that of the loading level of the third positive electrode coating layer 123c and the loading level of the fourth positive electrode coating layer 123d.

TABLE 7

| | Kinds | Loading level | Sum |
|---|---|---|---|
| Positive electrode | First positive electrode coating layer (124a) | 15.40 | 30.13 |
| | Second positive electrode coating layer (124b) | 14.73 | |
| | Third positive electrode coating layer (124c) | 15.40 | 30.56 |
| | Fourth positive electrode coating layer (124d) | 15.16 | |
| Negative electrode | First negative electrode coating layer (123a) | 15.67 | 30.67 |
| | Second negative electrode coating layer (123b) | 15.00 | |
| | Third negative electrode coating layer (123c) | 15.46 | 30.67 |
| | Fourth negative electrode coating layer (123d) | 15.21 | |

Figure 9:
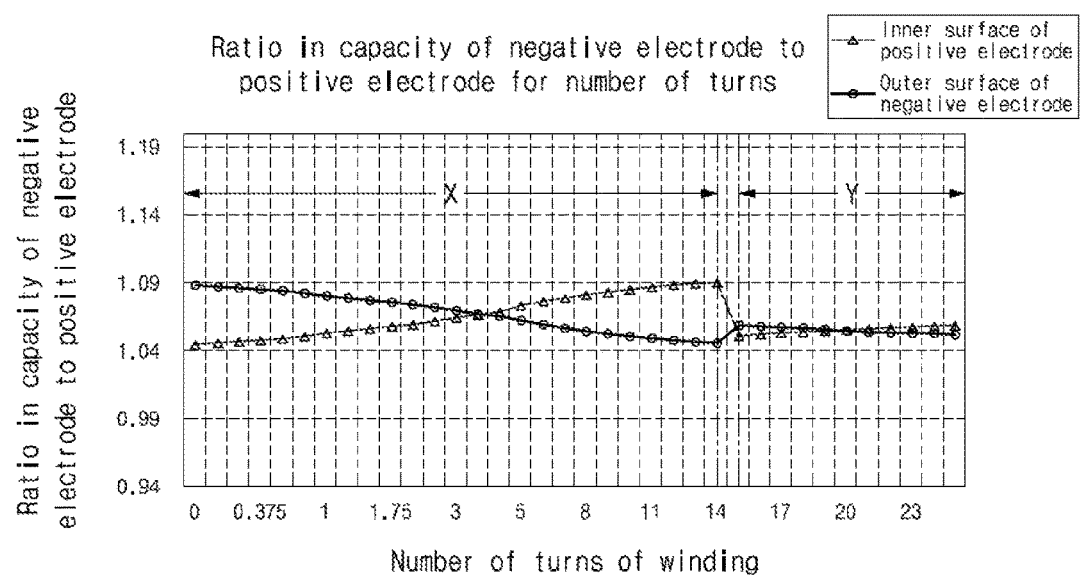
FIG. 9 is a view illustrating results of a ratio in capacity of a negative electrode to a positive electrode depending on the number of turns of winding of the electrode assembly according to another example of Embodiment 3 of the present invention.

In addition, when the loading levels of the positive electrode coating layer 124 and the negative electrode coating layer 123 are as shown in Table 7, a ratio in capacity of the negative electrode to the positive electrode on the inner surface 122ay of the positive electrode current collector plate 122a and a ratio in capacity of the negative electrode to the positive electrode on the outer surface 122az of the positive electrode current collector 122a may be the same as in FIG. 9 according to the number of turns of winding of the electrode assembly 120. When comparing the example (Table 6) to Table 7 of Embodiment 3, Table 6 and Table 7 are the same except that the loading level of the third positive electrode coating layer 124c and the loading level of the fourth positive electrode coating layer 124d are changed so that the same of the loading levels is greater than that of the loading level of the first positive electrode coating layer 124a and the loading level of the second positive electrode coating layer 124b. Here, the loading level of the first positive electrode coating layer 124a may be equal to or greater than the loading level of the third positive electrode coating layer 124c. As illustrated in FIG. 9, when the sum of the loading level of the third positive electrode coating layer 124c and the loading level of the fourth positive electrode coating layer 124d is greater than that of the first positive electrode coating layer 124a and the second positive electrode coating layer 124b, it is seen that the ratio in capacity of the negative electrode to the positive electrode the inner surface 122ay of the positive electrode current collector 122a on the rear end area Y and the ratio in capacity of the negative electrode to the positive electrode the outer surface 122az of the positive electrode current collector 122a on the rear end area Y further decrease compared to the example (Table 6 in FIG. 8) of Embodiment 3. That is, in the electrode assembly 120 as in another example (Table 7) of Embodiment 3, the loading level of the positive electrode coating layer 124 on the rear end area Y is set to be greater than the loading level of the positive electrode coating layer 124 on the front end area X so that the ratio in capacity of the negative electrode to the positive electrode is similar to the minimum ratio in capacity for preventing the lithium precipitation. In the electrode assembly 120 according to another example (Table 7) of Embodiment 3 as described above, the capacity of the negative electrode coating layer 123 may be prevented from unnecessarily increasing, and the amount of output to the capacity of the electrode assembly 120 may further increase compared to the example of (Table 6) of Embodiment 3.

The above-mentioned embodiments are merely embodiments of the electrode assembly and the secondary battery including the same, and thus, the present invention is not limited to the foregoing embodiments, and also it will be understood by those of ordinary skill in the art that various changes in form and details may be made therein without departing from the spirit and scope of the present invention as defined by the following claims.

INDUSTRIAL APPLICABILITY

The present invention may be applied to fields of secondary batteries for various electronic devices and electric vehicles.

The invention claimed is:
1. An electrode assembly comprising:
  a negative electrode plate on which a negative electrode coating layer is formed on both surfaces of a negative electrode current collector;
  a positive electrode plate on which a positive electrode coating layer is formed on both surfaces of a positive electrode current collector; and
  a separator interposed between the positive electrode plate and the negative electrode plate,
  wherein the positive electrode coating layer comprises:
    a first positive electrode coating layer formed on a front end area of a first surface of the positive electrode current collector;
    a second positive electrode coating layer formed on the front end area of a second surface that is an opposite surface of the first surface of the positive electrode current collector;
    a third positive electrode coating layer formed on a rear end area of the first surface of the positive electrode current collector, wherein the third positive electrode coating layer is spaced apart from the first positive electrode coating layer; and
    a fourth positive electrode coating layer formed on the rear end area of the second surface of the positive electrode current collector, wherein the fourth positive electrode coating layer is spaced apart from the second positive electrode coating layer,
  wherein a loading level of the first positive electrode coating layer is greater than a loading level of the second positive electrode coating layer, and
  each of a loading level of the third positive electrode coating layer and a loading level of the fourth positive electrode coating layer is less than the loading level of the first positive electrode coating layer and is greater than the loading level of the second positive electrode coating layer, and
  wherein a sum of the loading level of the first positive electrode coating layer and the loading level of the second positive electrode coating layer is equal to or less than the sum of the loading level of the third positive electrode coating layer and the loading level of the fourth positive electrode coating layer.

2. The electrode assembly of claim 1, wherein the negative electrode coating layer comprises:
   a first negative electrode coating layer formed on a front end area of a first surface of the negative electrode current collector;
   a second negative electrode coating layer formed on the front end area of a second surface that is an opposite surface of the first surface of the negative electrode current collector;
   a third negative electrode coating layer formed on a rear end area of the first surface of the negative electrode current collector; and
   a fourth negative electrode coating layer formed on the rear end area of the second surface of the negative electrode current collector.

3. The electrode assembly of claim 2, wherein the loading level of the first negative electrode coating layer and the loading level of the third negative electrode coating layer are the same, and
   the loading level of the second negative electrode coating layer and the loading level of the fourth negative electrode coating layer are the same and less than the loading level of the first negative electrode coating layer.

4. The electrode assembly of claim 2, wherein the loading level of the first negative electrode coating layer is greater than the loading level of the second negative electrode coating layer, and
   the loading level of the third negative electrode coating layer and the loading level of the fourth negative electrode coating layer are less than the loading level of the first negative electrode coating layer and greater than the loading level of the second negative electrode coating layer.

5. The electrode assembly of claim 4, wherein a sum of the loading level of the first negative electrode coating layer and the loading level of the second negative electrode coating layer is the same as a sum of the loading level of the third negative electrode coating layer and the loading level of the fourth negative electrode coating layer.

6. The electrode assembly of claim 1, wherein the positive electrode plate further comprises:
   a first positive electrode non-coating portion, on which the first positive electrode coating layer and the third positive electrode coating layer are spaced apart from each other so that the positive electrode coating layer is not formed, on the first surface;
   a second positive electrode non-coating portion, on which the second positive electrode coating layer and the fourth positive electrode coating layer are spaced apart from each other so that the positive electrode coating layer is not formed, on the second surface; and
   a positive electrode tab attached to any one of the first positive electrode non-coating portion or the second positive electrode non-coating portion.

7. The electrode assembly of claim 2, wherein the negative electrode plate further comprises:
   a first negative electrode non-coating portion, on which the first negative electrode coating layer and the third negative electrode coating layer are spaced apart from each other so that the negative electrode coating layer is not formed, on the first surface;
   a second negative electrode non-coating portion, on which the second negative electrode coating layer and the fourth negative electrode coating layer are spaced apart from each other so that the negative electrode coating layer is not formed, on the second surface; and
   a negative electrode tab attached to any one of the first negative electrode non-coating portion or the second negative electrode non-coating portion.

8. An electrode assembly comprising:
   a negative electrode plate on which a negative electrode coating layer is formed on both surfaces of a negative electrode current collector;
   a positive electrode plate on which a positive electrode coating layer is formed on both surfaces of a positive electrode current collector; and
   a separator interposed between the positive electrode plate and the negative electrode plate,
   wherein the negative electrode coating layer comprises:
      a first negative electrode coating layer formed on a front end area of a first surface of the negative electrode current collector;
      a second negative electrode coating layer formed on the front end area of a second surface that is an opposite surface of the first surface of the negative electrode current collector;
      a third negative electrode coating layer formed on a rear end area of the first surface of the negative electrode current collector, wherein the third negative electrode coating layer is spaced apart from the first negative electrode coating layer; and
      a fourth negative electrode coating layer formed on the rear end area of the second surface of the negative electrode current collector, wherein the fourth negative electrode coating layer is spaced apart from the second negative electrode coating layer,
   wherein a loading level of the first negative electrode coating layer is greater than a loading level of the second negative electrode coating layer, and
   each of a loading level of the third negative electrode coating layer and a loading level of the fourth negative electrode coating layer is less than the loading level of the first negative electrode coating layer and is greater than the loading level of the second negative electrode coating layer,
   wherein a sum of the loading level of the first negative electrode coating layer and the loading level of the second negative electrode coating layer is equal to or less than a sum of the loading level of the third negative electrode coating layer and the loading level of the fourth negative electrode coating layer.

9. The electrode assembly of claim 8, wherein the positive electrode coating layer comprises:
   a first positive electrode coating layer formed on a front end area of a first surface of the positive electrode current collector;
   a second positive electrode coating layer formed on the front end area of a second surface that is an opposite surface of the first surface of the positive electrode current collector;
   a third positive electrode coating layer formed on a rear end area of the first surface of the positive electrode current collector; and
   a fourth positive electrode coating layer formed on the rear end area of the second surface of the positive electrode current collector, wherein a loading level of the first positive electrode coating layer is the same as a loading level of the third positive electrode coating layer, and a loading level of the second positive electrode coating layer and a loading level of the fourth positive electrode coating layer are the same and less than the loading level of the first positive electrode coating layer.

10. A secondary battery comprising:

the electrode assembly of claim 1;

a case having an internal space, wherein the electrode assembly accommodates an electrolyte in the internal space; and a cap plate coupled to an upper portion of the case to seal the case.

* * * * *